(12) United States Patent
Steinberger

(10) Patent No.: US 11,549,530 B2
(45) Date of Patent: Jan. 10, 2023

(54) LEVERAGED SPRING CLAMP AND RELATED METHODS

(71) Applicant: Richard Ned Steinberger, Nobleboro, ME (US)

(72) Inventor: Richard Ned Steinberger, Nobleboro, ME (US)

(*) Notice: Subject to any disclaimer, the term of this patent is extended or adjusted under 35 U.S.C. 154(b) by 0 days.

(21) Appl. No.: 17/200,656

(22) Filed: Mar. 12, 2021

(65) Prior Publication Data

US 2021/0285474 A1 Sep. 16, 2021

Related U.S. Application Data

(60) Provisional application No. 62/988,862, filed on Mar. 12, 2020.

(51) Int. Cl.
*B25B 5/04* (2006.01)
*F16B 2/18* (2006.01)
*F16B 2/10* (2006.01)

(52) U.S. Cl.
CPC .............. *F16B 2/185* (2013.01); *F16B 2/10* (2013.01); *B25B 5/04* (2013.01); *Y10T 24/44462* (2015.01)

(58) Field of Classification Search
CPC ..... B25B 5/04; B25B 5/16; B25B 5/06; F16B 2/10; Y10T 24/3435; Y10T 24/3437; Y10T 24/44462
See application file for complete search history.

(56) References Cited

U.S. PATENT DOCUMENTS

| | | |
|---|---|---|
| 7,007,936 B2 | 3/2006 | Chang |
| 7,107,881 B1 | 9/2006 | Liou |
| 7,441,313 B2 | 10/2008 | Degen |
| 7,677,141 B1 | 3/2010 | Crew |
| 8,779,262 B1 | 7/2014 | Steinberger |
| 9,754,563 B1 | 9/2017 | Chen |
| 2005/0193529 A1 | 9/2005 | Degen |
| 2012/0211932 A1 | 8/2012 | Liou |
| 2015/0008631 A1 | 1/2015 | Liu |

*Primary Examiner* — Robert Sandy
*Assistant Examiner* — Michael S Lee
(74) *Attorney, Agent, or Firm* — Daniel A. Tesler

(57) ABSTRACT

A spring clamp wherein a reduced effort is needed on the handle end as the engagement end is opened further. The spring clamp can include a clamping force adjustment means through the use of a spring pack, central rod and a folding adjuster. The spring clamp can also include low friction mounts at the ends of a spring pack to reduce user effort on the handle end.

8 Claims, 13 Drawing Sheets

LEVERAGED SPRING CLAMP AND RELATED METHODS

CROSS REFERENCE TO RELATED APPLICATIONS

The present application is a United Stated utility patent application claiming priority to U.S. Provisional Patent Application No. 62/988,862 filed Mar. 12, 2020, which is hereby incorporated by reference in its entirety.

BACKGROUND

1. Field

The present disclosure relates to spring clamps, specifically spring clamps with a leveraged mechanism to reduce the amount of effort needed for fully opening.

2. Discussion of Prior Art

Spring clamps generally have a handle end that a user grasps and squeezes and an engagement end that holds or grasps an object, with an arc of motion on both ends. According to Hooke's Law, the force required to compress a spring for a given distance x is linear when the distance x is small compared to the overall possible length of deformation of the spring (assuming no coil bind, plastic deformation, etc.). Therefore, compressing a spring requires a linear increase in compression force, meaning the force a user must exert on the handle end increases as the engagement end opens further. As such, prior art spring clamps are undesirable because it can be difficult for a user to fully open the engagement end, especially for users with lower physical strength.

The present invention is directed at overcoming, or at least improving upon, the disadvantages of the prior art.

BRIEF SUMMARY

The present invention accomplishes this goal by providing a spring clamp with a leveraged mechanism that can, in some aspects, reduce the amount of force a user must exert on the handle end as the engagement end opens further.

The disclosure includes a spring clamp, which comprises a first arm comprising a handle end opposite an engagement end, a second arm comprising a handle end opposite an engagement end, the first arm and the second arm rotatably fixed about a pivot point located between the handle end and engagement end of the first arm and the second arm, a spring pack operably connected to the first arm and the second arm, the spring pack comprising at least one spring, wherein a critical distance, defined between the pivot point and a spring force vector of the spring pack and configured to exert at least one of: (i) a predetermined clamping force exerted between the engagement ends of the first arm and the second arm, and wherein the first arm and the second arm are configured to house the spring pack between the first arm and the second arm when the spring clamp is in any position within its rotational limits. The spring pack can comprise a central rod located through the axial center of a coil spring, a fixed perch fixed to the central rod towards a first end, the central rod comprising a threaded portion between a second end and the first end, an adjustable perch in threaded communication with the central rod, so that the coil spring is positioned between the fixed perch and adjustable perch and axially about the central rod, the threaded portion of the central rod and the adjustable perch configured to rotate relative to the coil spring, and an adjuster arm pivotably fixed to the second end of the central rod.

The disclosure further describes a spring clamp where the second end of the central rod further comprises a bias element configured to bias the adjuster arm in a plurality of positions, the bias element comprising a cupped element rotatably fixed to the central rod in a fixed position axially, the cupped element comprising a cylindrical wall with an open end and an opposite end with a panel containing an axially located opening corresponding to the size of the central rod, a washer located about the central rod, between the cupped element and the second end of the central rod, and a bias element coil spring located about the central rod and between the cupped element and the washer. The bias element of the spring clamp can be configured to bias an elongate portion of the adjuster arm in an open position or a stored position, the open position being where the elongate portion of the adjuster arm is perpendicular to the coil spring and the stored position being where the elongate portion of the adjuster arm is parallel to the coil spring. The coil spring can further have an adjuster arm configured to be biased into at least one position where the adjuster arm can rotate 360 degrees without being encumbered by another element of the spring clamp.

The spring pack described can further comprise a first triangular element fixed to the fixed perch and a second triangular element fixed to the cup, where the first triangular element and the second triangular element comprise a triangular cross-section, where the first arm comprises an angular relief configured to engage the first triangular element, where the second arm comprises an angular relief configured to engage the second triangular element, and where the angular relief of the second arm comprises at least two sides terminating in an angle configured to engage the second triangular element.

The spring clamp disclosed can also be configured so that the first arm comprises a hollow portion facing the spring pack, where the second arm comprises a hollow portion facing the spring pack and an asymmetrical shape relative to the first arm, where the hollow portions and asymmetrical shape are configured to allow the spring pack to be fully located within the two hollow portions when the handle ends of the spring clamp are fully pressed together.

The spring clamp disclosed can be configured so that the critical distance generates a decreasing relationship between the force pushing the handle ends together compared to the distance between the engagement ends for a portion of the rotational limits of the spring clamp, and wherein the critical distance is further configured to generate an increasing relationship between the force pushing the handle ends together compared to the distance between the engagement ends for a portion of the rotational limits of the spring clamp. The increasing relationship can occur from when the engagement ends are touching to when the engagement ends are at the mid-point of their rotational limit and the decreasing relationship can occur when the engagement ends are at the mid-point of their rotational limit to when the engagement ends are at their open position rotational limit. The increasing relationship and the decreasing relationship can be non-linear. The increasing relationship and the decreasing relationship can also form an inverse parabolic curve, peaking when the engagement ends are at the mid-point of their rotational limits.

Also contained in this disclosure is a spring clamp, which comprises, a first arm comprising a handle end opposite an engagement end, a second arm comprising a handle end opposite an engagement end, the first arm and the second arm rotatably fixed about a pivot point located between the handle end and engagement end of the first arm and the second arm, a spring pack comprising a coil spring and operably connected to the first arm and the second arm through a contact between the spring pack and an angular relief in the first arm and an angular relief in the second arm, wherein a critical distance, defined between the pivot point and a spring force vector of the spring pack and configured to exert at least one of: (i) a predetermined clamping force exerted between the engagement ends of the first arm and the second arm, wherein the second arm further comprises a plurality of angular reliefs positioned at a plurality of critical distances, and wherein the first arm and the second arm are configured to house the spring pack between the first arm and the second arm when the spring clamp is in any position within its rotational limits. The angular relief on the first arm can comprise two planar walls meeting at an apex with an angle of 270 degrees to 310 degrees. The spring pack can further include a first triangular element fixed to one end and a second triangular element fixed to an opposite end, and the first triangular element and the second triangular element comprising a triangular cross-section configured to engage the angular relief on the first arm and the angular reliefs of the second arm, respectively. The angular reliefs can each comprise an apex, where the second triangular element is configured to rotate about the apex on the angular relief on the second arm as the spring clamp moves from closed to open.

The critical distance of the spring clamp can be configured to generate a decreasing relationship between the force pushing the handle ends together compared to the distance between the engagement ends for a portion of the rotational limits of the spring clamp, and wherein the critical distance is further configured to generate an increasing relationship between the force pushing the handle ends together compared to the distance between the engagement ends for a portion of the rotational limits of the spring clamp. The increasing relationship can occur from when the engagement ends are touching to when the engagement ends are at the mid-point of their rotational limit; and the decreasing relationship occurs when the engagement ends are at the mid-point of their rotational limit to when the engagement ends are at their open position rotational limit. The increasing relationship and the decreasing relationship can be non-linear. The increasing relationship and the decreasing relationship can form an inverse parabolic curve, peaking when the engagement ends are at the mid-point of their rotational limits.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein.

DETAILED DESCRIPTION

Illustrative embodiments are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another.

Moreover, it will be appreciated that such a development effort might be complex and time-consuming but would nevertheless be a routine undertaking for those of ordinary skill in the art having the benefit of this disclosure. The leveraged spring clamp disclosed herein boasts a variety of inventive features and components that warrant patent protection, both individually and in combination.

The present disclosure relates to a spring clamp with a leveraged mechanism configured to provide a lessening effort on the handle end as the engagement end is opened wider.

Figure 1:
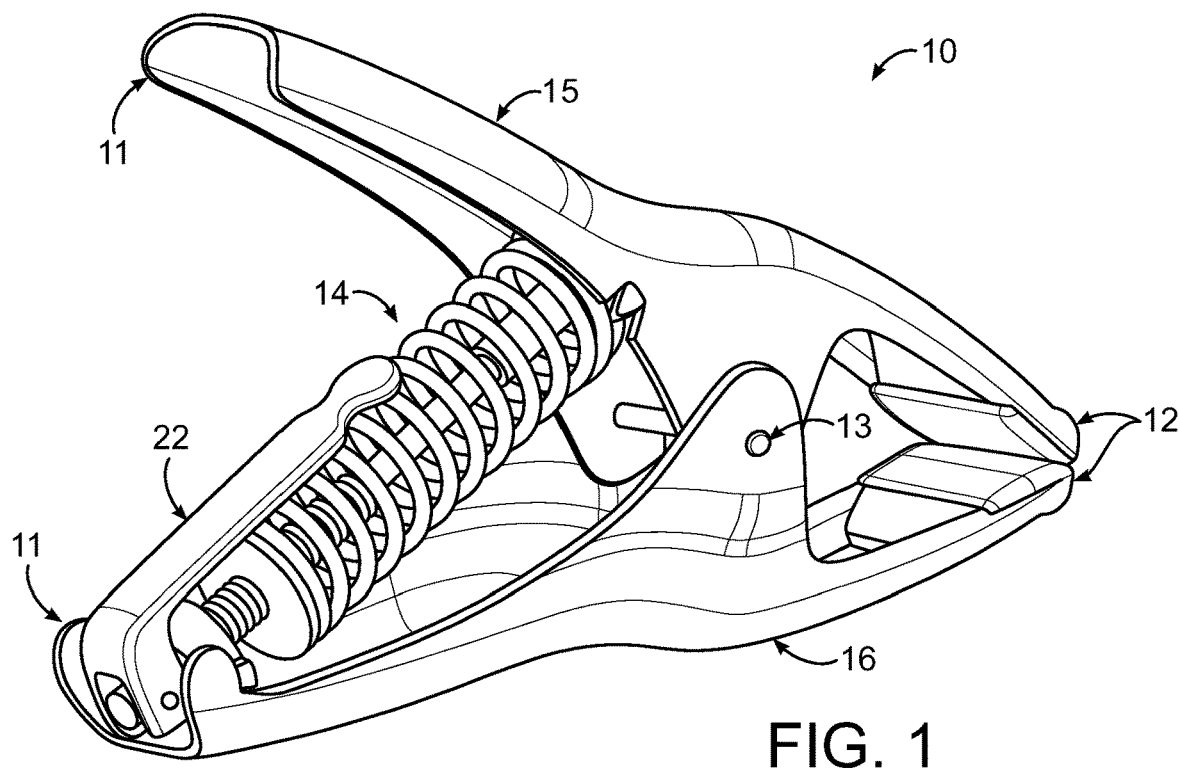
FIG. 1 is a perspective view of a spring clamp according to a first example embodiment shown in a closed position.

In FIG. 1 is a perspective view of a first example embodiment of the spring clamp 10. The spring clamp can comprise a first jaw 15 rotatably attached to a second jaw 16 about a pivot 13. The pivot 13 can comprise any means for inducing rotary motion about the location where the first jaw 15 and second jaw 16 meet, including a pin extending from the right side of the spring clamp 10 to the left side of the spring clamp 10 or a separate pin or bearing on each right or left side of the spring clamp 10. Coupled to the first jaw 15 can be the first end of a spring pack 14 and coupled to the second jaw 16 can be the second end of the spring pack 14.

In FIG. 1, the spring clamp 10 is in a closed position so that the handle ends 11 are at their furthest position apart and the engagement ends 12 are touching. The handle ends 11 can be hollow to enable the spring pack 14 to nest fully within the handle ends 11 when the spring clamp is in an open or closed position.

Figure 2:
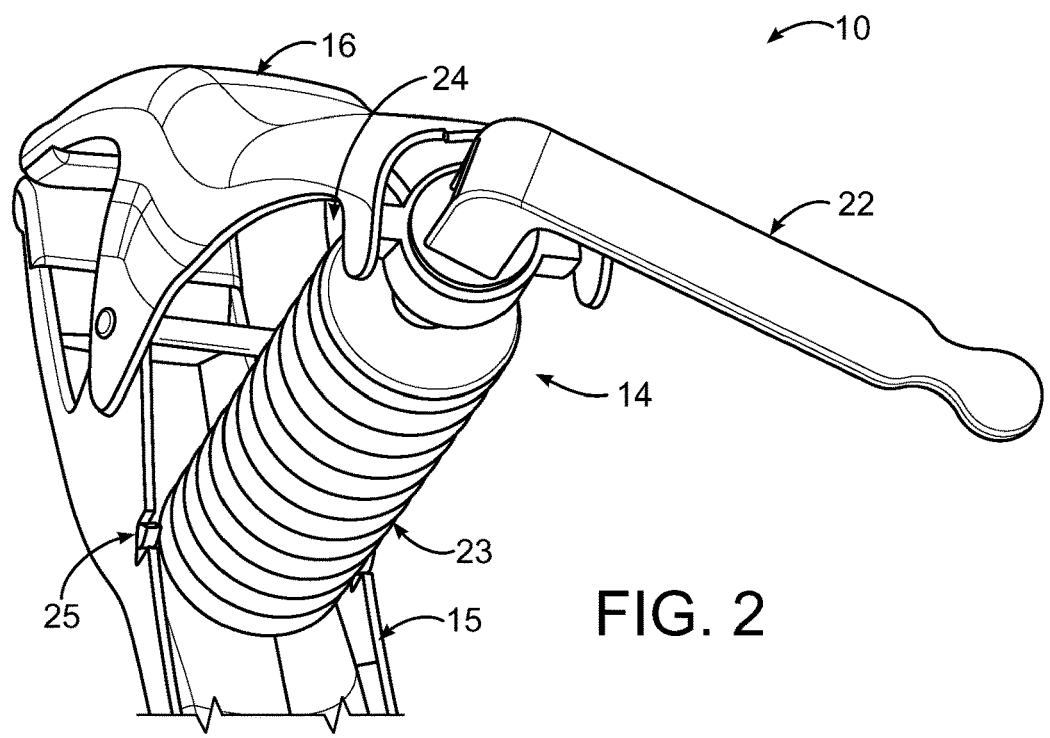
FIG. 2 is a perspective view of the spring clamp shown in FIG. 1 in a closed position and illustrating a spring adjuster feature according to an aspect of the present disclosure.

FIG. 2 is a perspective view of the first example embodiment of the spring clamp 10 in a closed position, showing the spring adjuster arm 22 in detail. The spring pack 14 can include a coil spring 23 mounted between a set of first mounts 24 on one end and a set of second mounts 25 on a second end. The mounts 24 and 25 can be triangular in cross section to reduce friction. A triangular mount 24 and 25 can provide less friction than a shaft mount, which could have a larger diameter.

Figure 3:
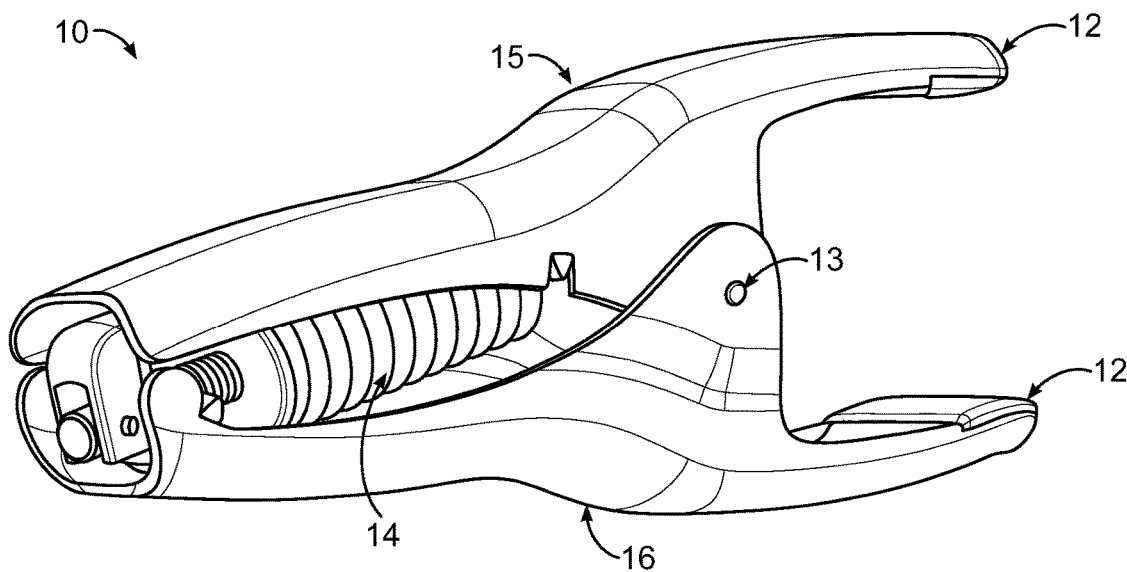
FIG. 3 is a perspective view of the spring clamp of FIG. 1 in an open position.

FIG. 3 is a perspective view of the first example embodiment of the spring clamp 10 in an open position. As used herein, an "equilibrium position" refers to any position where the engagement ends 12 are paused or otherwise maintained in a static position during rotation. The engagement ends 12 can be paused in rotation when they are touching one another (e.g., when the spring clamp 10 is closed) or when the engagement ends 12 are resting on either side of an object, such as in FIG. 4. As used herein, a "closed position" refers to any position where the engagement ends 12 are paused or otherwise maintained in a static position during rotation, touching and/or resting on opposite sides of an object. As used herein, an "open position" refers to any position where the engagement ends 12 are separated.

Figure 4:
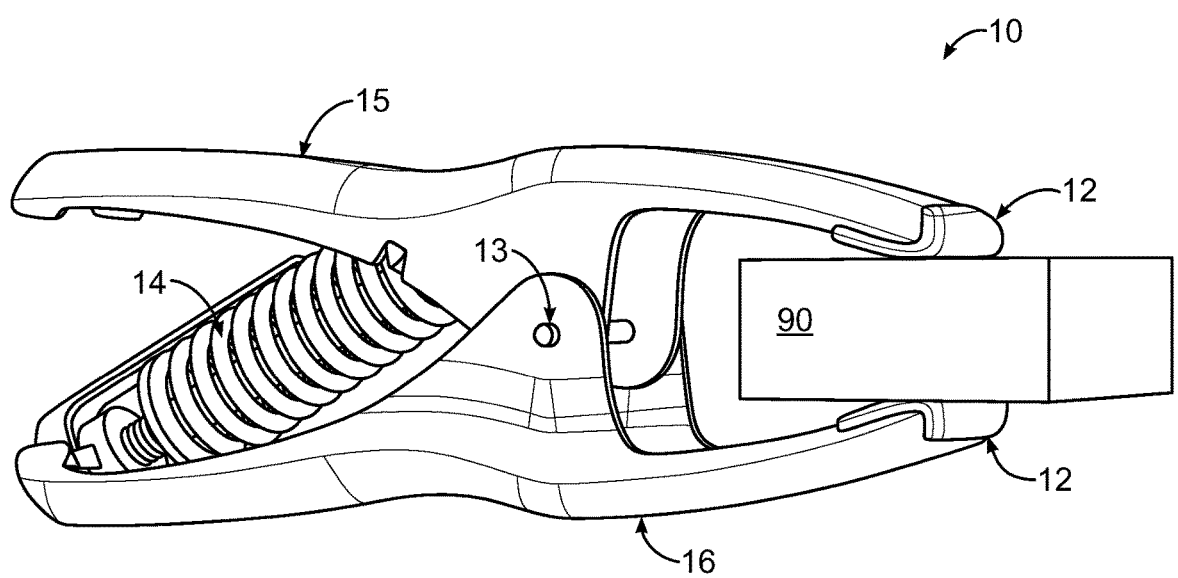
FIG. 4 is a perspective view of the spring clamp of FIG. 1 in an equilibrium position, where an engagement end is clamped on a block.

FIG. 4 is a perspective view of the first example embodiment of the spring clamp 10 in an equilibrium position where the engagement ends 12 are paused in rotation on a block 90. In FIG. 4, the engagement ends 12 can cause a clamping force to be exerted upon the upper and lower surfaces of the block 90. Any directions used herein are for clarity only and are not intended to limit the scope of the disclosure.

Figure 5:
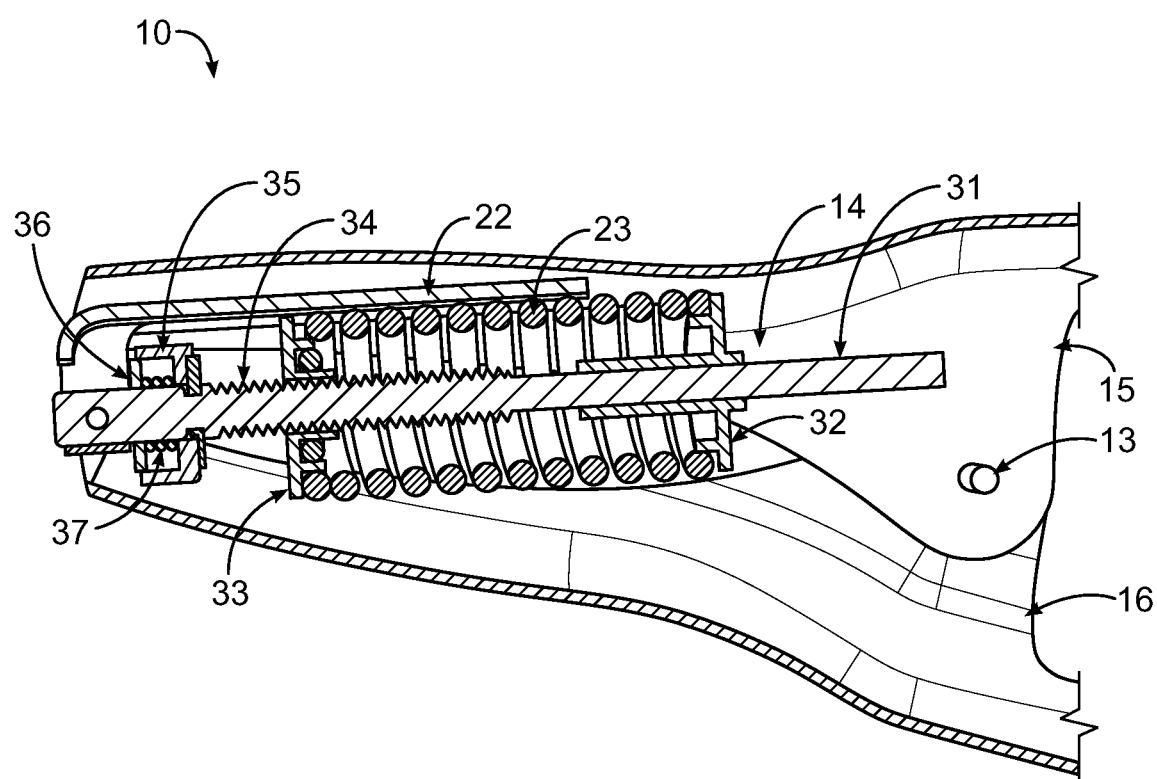
FIG. 5 is a side sectioned view of the spring clamp of FIG. 1 in an open position as shown in FIG. 3.

FIG. 5 is a side sectioned view of the first example embodiment of the spring clamp 10 in an open position. The side sectioned view of FIG. 5 is sectioned generally down the vertical center of the spring clamp 10 and the axial center of the spring pack 14 mounted between the first jaw 15 and second jaw 16. The spring pack 14 can comprise a central rod 31 with a fixed perch 32 on one end and an adjustable perch 33 on another end. The mounts 24 and 25 can be fixed relative to the fixed perch 32 and the cupped shaped element 35.

The adjustable perch 33 can be provided by configuring the central rod 31 with a threaded portion 34 capable of being rotated relative to the coil spring 23 and the adjustable perch 33. The adjustable perch 33 can be configured with a corresponding thread to the central rod 31 so that a rotation of the central rod 31 causes the adjustable perch 33 to move in a linear motion. In some embodiments, the central rod 31 can be manipulated through the use of the adjuster arm 22. The adjuster arm 22 can be generally elongate with a 90 degree section terminating with a squared off end, the squared off end hinged to the central rod 31. The adjuster arm 22 is preferably configured so that it has multiple positions relative to the central rod 31, including at least a stored position and an adjustment position. The adjuster arm 22 can be biased into a stored or adjustment position by including a washer 36 backed by a spring 37 acting against a cupped shaped element 35 rotatably attached to a portion of the central rod 31 and located between the adjustable perch 33 and the adjuster arm 22. The cupped shaped element 35 is more particularly a cylindrical element with an open end and an opposite end with a panel containing an axially located opening corresponding to the size of the central rod, where the cupped shaped element 35 is rotatably fixed to the central rod 31. The stored position of the adjuster arm 22 can be a position where the elongate portion of the adjuster arm 22 is about parallel with the central rod 31. As used here, "about parallel" refers to any configuration where two generally elongate members are within plus or minus 10 degrees of parallel to one another. The adjustment position of the adjuster arm 22 can be a position where the elongate direction of the adjuster arm 22 is about perpendicular with the central rod 31. As used herein, "about perpendicular" refers to any configuration where two generally elongate members are within plus or minus 45 degrees of perpendicular to one another.

The adjustable perch 33 can allow a user to compress or decompress the coil spring 23, providing a way to adjust the clamping force of the spring clamp 10. In some embodiments, the amount of difference in clamping force changes more as the adjustable perch 33 compresses the coil spring 23 at the beginning of its adjustment range.

Figure 6:
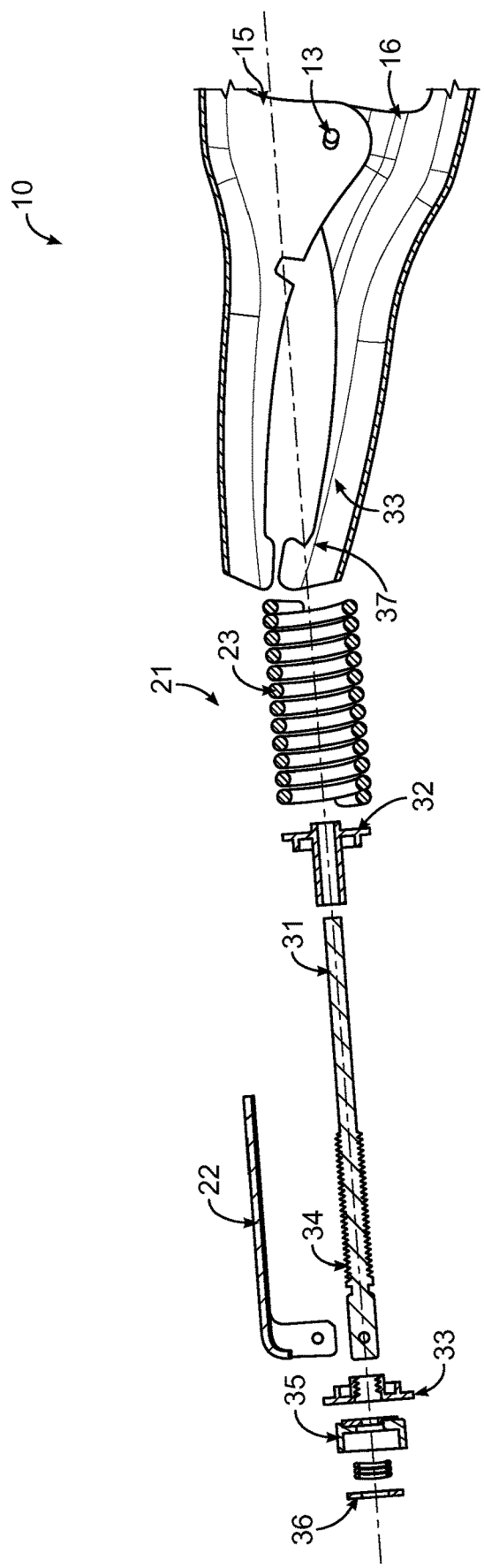
FIG. 6 is an exploded side sectioned view of the grip region of the spring clamp of FIG. 1 while in the open position shown in FIG. 3, illustrating a spring pack according to an aspect of the present disclosure.

FIG. 6 is an exploded view of the spring pack 14 along with its components, including the central rod 31, the fixed perch 32 fixed to the central rod 31 on one end and the adjustable perch 33 on another end of the central rod 31. The mounts 24 and 25 (not visible in FIG. 6) are fixed relative to the fixed perch 32 and the cupped element 35. The adjustable perch 33 can be configured with a threaded portion configured to engage a threaded portion on the central rod 31. The adjustments provided on the spring pack 14 allow adjustments to the preload on the coil spring 23, which provide an adjustment to either the force applied to the handle ends 11 or the force pushing together the engagement ends 12.

Figure 7:
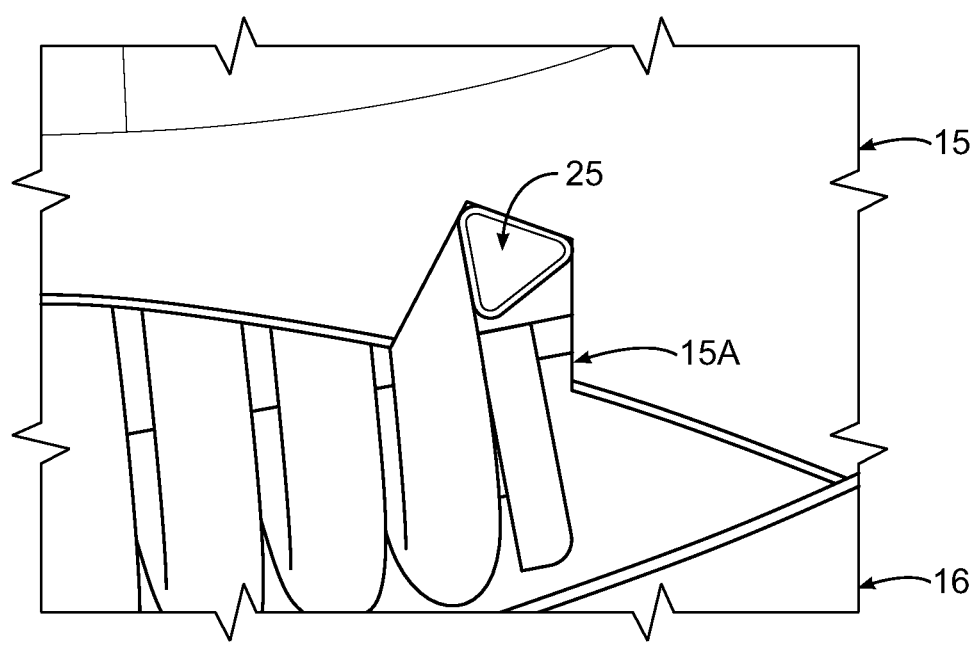
FIG. 7 is a side view of a notch area forming part of the spring clamp of FIG. 1 with the spring in a first position that can decrease friction according to an aspect of the present disclosure.

FIG. 7 is a side view of the notch area 15A and its interface with the mount 25 of the spring pack 14. The use of mounts 25 and notch areas 15A reduces the amount of friction at the ends of the spring pack 14, allowing the use of a higher spring rate in the spring pack 14. The use of a mount 25 with a pointed area at a point of rotation, coupled with the shape of the notch areas 15A significantly reduces the amount of rotational friction between the mount 25 and the notch area 15A as the mount 25 rotates. If the mount 25 was a true point, the friction between the mount 25 and the notch area 15A would theoretically be zero. In some embodiments, the mount 25 comprises a pointed area with a small radius. The mount 25 can require a small radius rather than a true point due to the materials and forces involved. In some embodiments, the small radius is about 0.01 inches, where "about" is plus or minus 40%. When compared to a shaft of 0.060 inches, the shaft has about six times the friction between the mount 25 with a small radius and the notch area 15A.

Figure 8A:
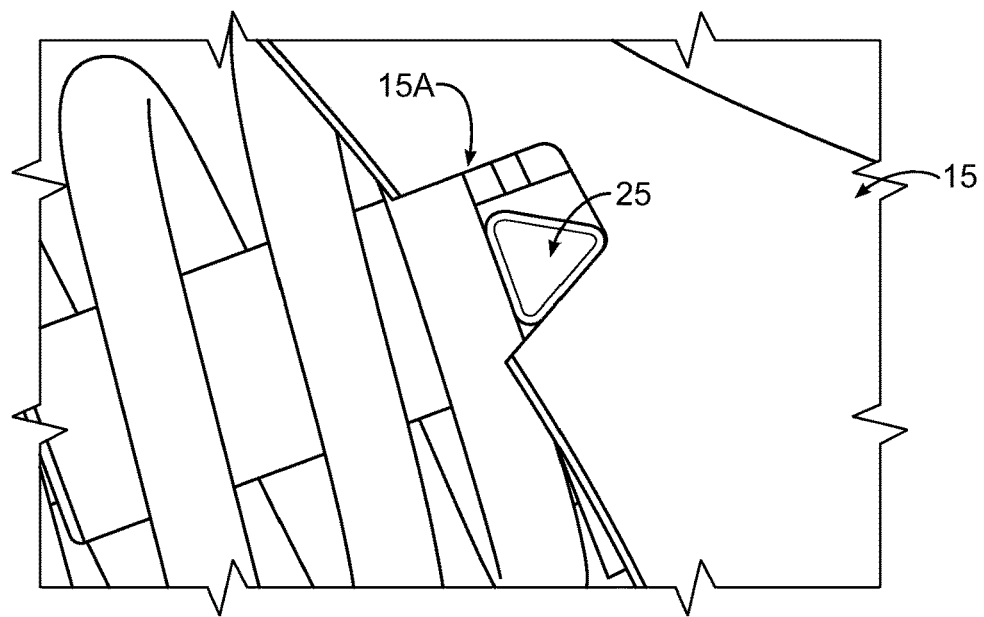
FIG. 8A is a side view of a notch area forming part of the spring claim of FIG. 1 with the spring in a second position that can decrease friction according to another aspect of the present disclosure.

The notch areas 15A can comprise a cutout on a jaw 15 of the spring clamp 10 where each edge of the cutout is configured to allow the mount 25 to rotate freely as the spring clamp 10 moves through its arc of movement on both the handle end 11 and engagement end 12. In some embodiments, the mount 25 is configured to rotate about at least one apex when the spring clamp 10 is moved from an open position to a closed position or vice versa. In FIG. 7, an edge of the mount 25 is rotated near the notch area 15A. In FIG. 8A, a different edge of the mount 25 is rotated near the notch area 15A.

Figure 8B:
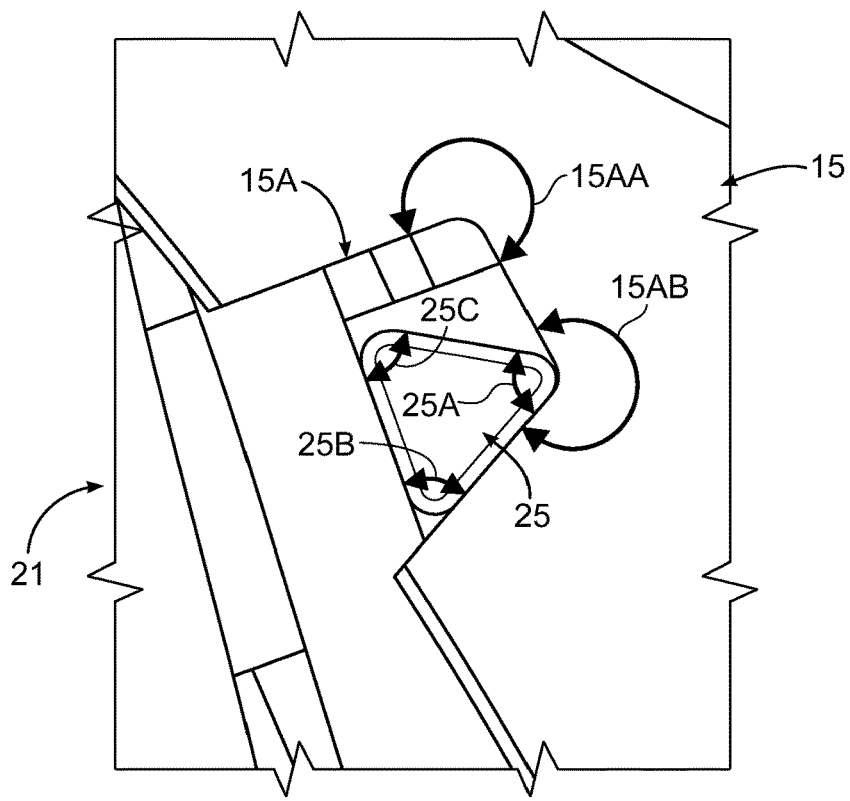
FIG. 8B is a close-up side view of the notch area of FIG. 8 identifying the relevant angles.

FIG. 8B is a close-up view of FIG. 8A with the internal angles of the mount 25 and the angles of the notch area 15A identified. The mount 25 can have internal angles 25A, 25B and 25C. While the mount 25 can have a generally triangular cross-section, it is not necessarily a true triangle and can have rounded apexes on its outer or rotating surfaces. As noted earlier, some embodiments comprise rounded apexes or radiused points due to the materials and force applied at the points of the mount 25. The internal angles 25A, 25B and 25C can be substantially the same. Substantially the same, as used herein, refers to a value that is within plus or minus 10% of one another. In some embodiments, internal angle 25A is less than internal angles 25B and 25C and internal angles 25B and 25C are substantially the same.

Angle 15AB identifies the angle used in the notch area 15A between the area of the notch area 15A furthest from the handle end 11 and the edges of the notch area 15A that angle towards the handle end 11. In some embodiments, angle 15AB can be about 270-310 degrees. In some embodiments, angle AB can be about 280-300 degrees. In some embodiments, angle AB can be about 290-300 degrees. While angle 15AB is identified as an angle, it does not necessarily need to have an apex that is a point. In some embodiments, the apex of angle 15AB comprises a rounded apex or a radius.

While some values have been given for angle 15AB, its precise value for a given embodiment will depend on the size of the mount 25, the internal angles 25A, 25B and 25C and the lengths of the sides of the mount 25. The notch area 15A is preferably sized so that the mount 25 is capable of rotating as the engagement end 12 is moved from an open position to a closed position (or vice versa) without the mount 25 sliding out of the notch area 15A.

Figure 9:
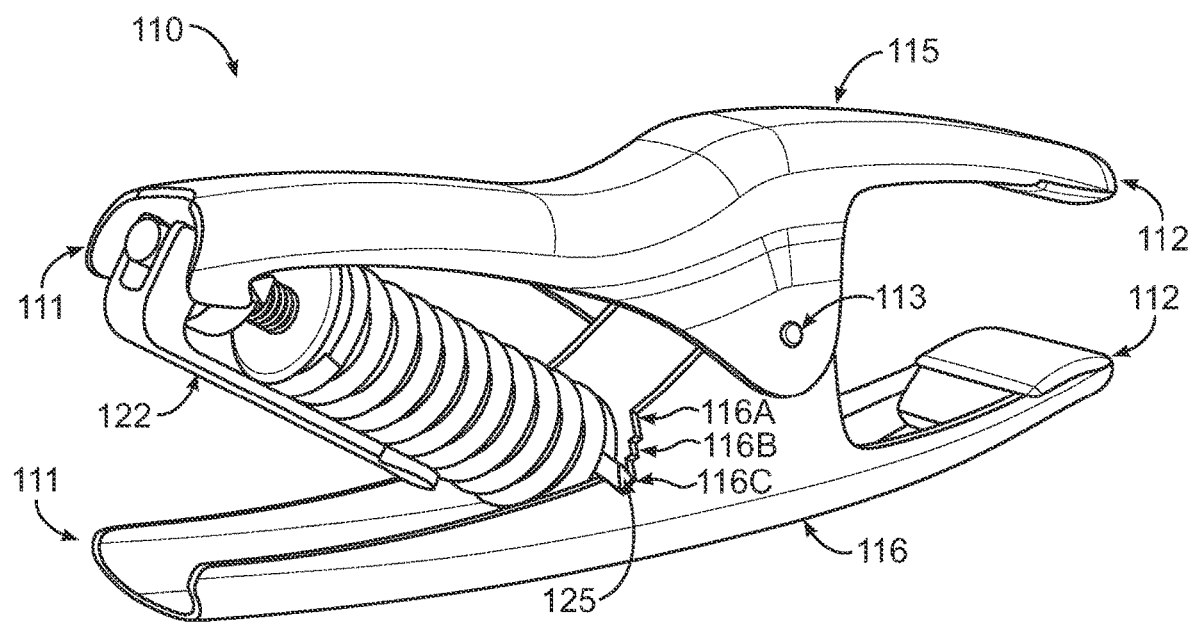
FIG. 9 is a perspective view of a spring clamp according to a second example embodiment shown in a closed position.

FIG. 9 is a perspective view of a second example embodiment of the spring clamp 110. The elements in the alternative embodiment which are substantially the same as the corresponding elements of the first embodiment described are identified with the same numeral. Elements which are similar (but not necessarily identical) in function are denoted by the same numeral plus 100.

The spring clamp 110 can comprise a first jaw 115 rotatably attached to a second jaw 116 about a pin 113. Coupled to the first jaw 115 can be the first end of a spring pack 114 and coupled to the second jaw 116 can be the second end of the spring pack 114. The spring clamp 110 can include multiple notch areas on a single jaw to provide additional adjustment potential for the spring clamp 110. In some embodiments, jaws 115 and 116 are asymmetrical to take advantage of the geometry of the spring and the human hand. The handle ends 111 of the first jaw 115 and second jaw 116 can be hollow inside and configured to allow the spring pack 114 to nest within the handle ends 111 when the spring clamp is in any position. An asymmetrically shaped first jaw 115 and second jaw 116 can allow the spring pack 114 to fit better within the handle ends 111 when the spring clamp 110 is fully open.

In FIG. 9, the second jaw 116 can comprise a plurality of notch areas. Some embodiments include a first notch area 116A, a second notch area 116B and a third notch area 116C located adjacent to one another on a single jaw 116. Embodiments with multiple notch areas allow a user to use a combination of adjustments on the spring pack and the notch area to establish the desired clamping force by the spring clamp 110. While an example is shown with three notch areas, it is within the inventive concept to increase or decrease the number of notches on the spring clamp 110. Adjustments to the spring pack can increase or decrease the amount of clamping force exerted by the spring clamp 110, whether in an open, closed or neutral position. Selecting a different notch area can increase or decrease the amount of clamping force exerted by the spring clamp 110 in an open position, as explained herein. Changing the notch area to one with a larger critical distance 141 to the pivot point 113 of the spring clamp 110 increases the clamping force when the spring clamp 110 is in a more open position. As identified in FIG. 11, the critical distance 141 is the perpendicular distance between the spring force vector 140 and the pivot 113, which generally represents the amount of clamping force exerted by the spring clamp 110. Changing the notch area to one with a shorter critical distance 141 to the pivot point 113 of the spring clamp 110 decreases the clamping force when the spring clamp 110 is in a more open position. The multiple notch locations allow a user to select a configuration for the spring clamp 110 that provides the correct amount of clamping force for a particular jaw opening position. The multiple notch locations also allow a user to select a configuration for the spring clamp 110 that provides the correct amount of hand squeezing force needed on the handle ends 111 for the jaw opening position. A user can use the multiple notch locations and/or the spring adjuster arm 122 to fine tune a particular squeezing force needed on the handle ends 111 or a particular clamping force on the engagement ends 112. For example, if a work that requires the engagement end 112 to be nearly fully open needs to be clamped with high force, a user could select a notch location with a large perpendicular distance to the pivot point 113 to increase the clamping force at the open position. For example, if a work that requires the engagement end 112 to be nearly fully open needs to be clamped with a low amount of force or a low amount of force is desired on the handle end 111, a user could select a notch location with a small critical distance 141 to the pivot point 113 to decrease the clamping force at the open position.

Figure 10:
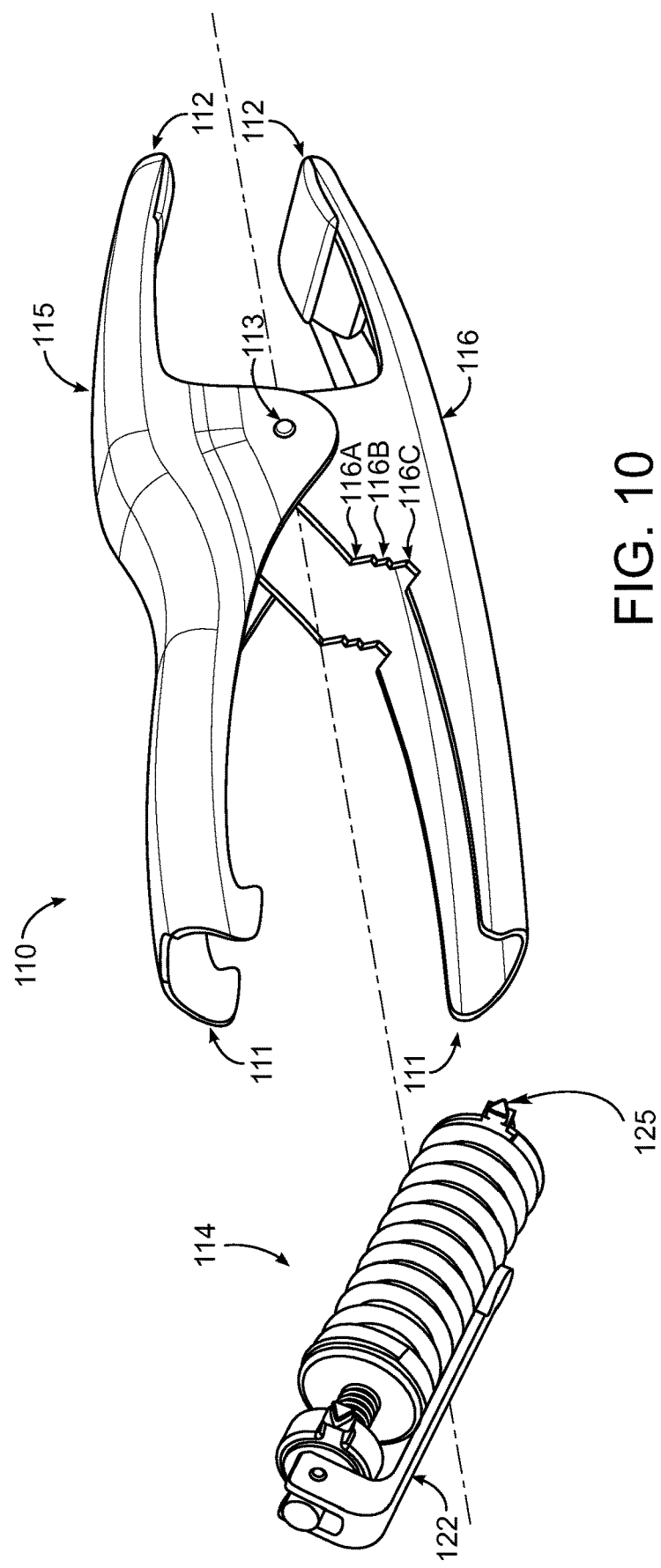
FIG. 10 is an exploded view of the spring clamp of FIG. 9, showing the individual components and the plurality of notch areas in detail according to aspects of the present disclosure.

FIG. 10 includes an exploded view of the spring clamp 110 in FIG. 9 and provides an additional view of the spring pack 114 and of the first notch area 116A, second notch area 116B and third notch area 116C on the second jaw 116, which are configured to receive the mount 125. The notch areas 116A-C can be molded or cut into portions of the second jaw 116 to provide adequate support for the mount 125.

By including multiple notch areas 116A-116C on a single jaw 116, a user can choose or adjust the spring force vector 140 and its critical distance 141 from the pivot 113. As the critical distance 141 is increased, the clamping force is generally increased. As the critical distance 141 is decreased, the clamping force is generally decreased. The clamping force can refer to either the force required by a user to open the handle end 111 or the amount of force exerted at the engagement end 112.

Figure 11:
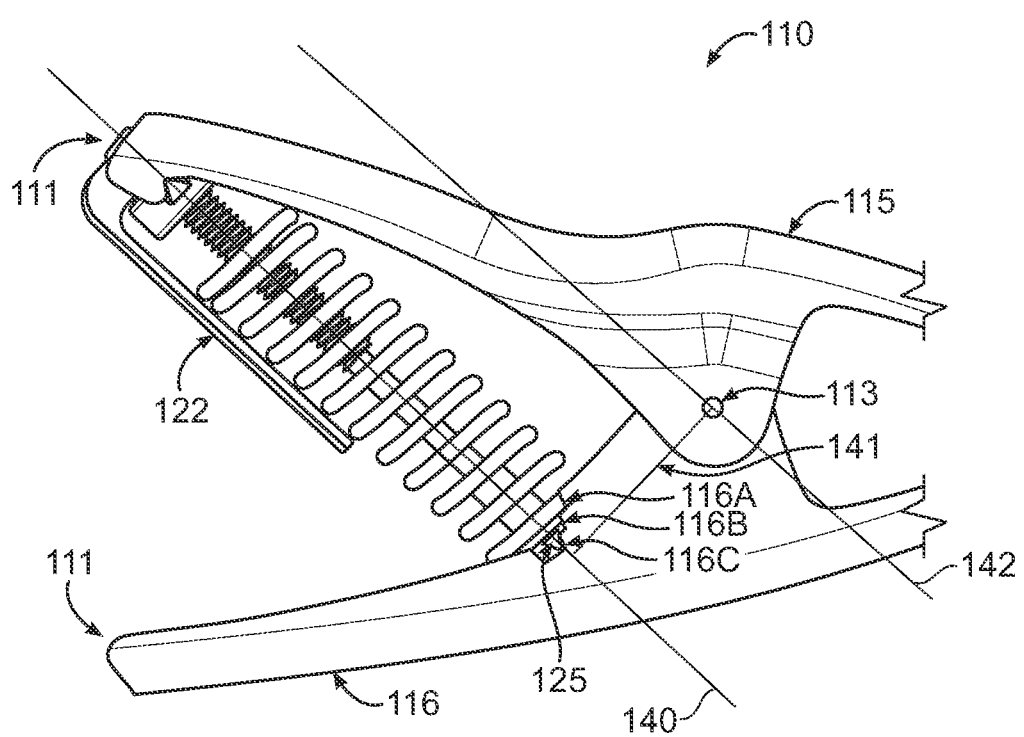
FIG. 11 is a side view of the spring clamp of FIG. 9 shown in a closed position and identifying the spring force vector and critical distance when perched in notch 116C.

For example, the spring clamp 110 is configured in FIGS. 9 & 11 with the mount 125 in notch area 116C, which provides the highest amount of clamping force when compared to when the mount 125 is in notch areas 116A or 116B. When the mount 125 is in notch area 116C, the critical distance 141 is larger than when in notch areas 116A or 116B. Increasing the critical distance 141 between the spring force vector 140 and the pivot 113 generally increases the power of the spring pack 114 and increases the clamping force. By providing multiple notch areas 116A-116C, a user can quickly adjust the power of the spring pack 114 and the clamping force of the spring clamp 110.

Figure 13:
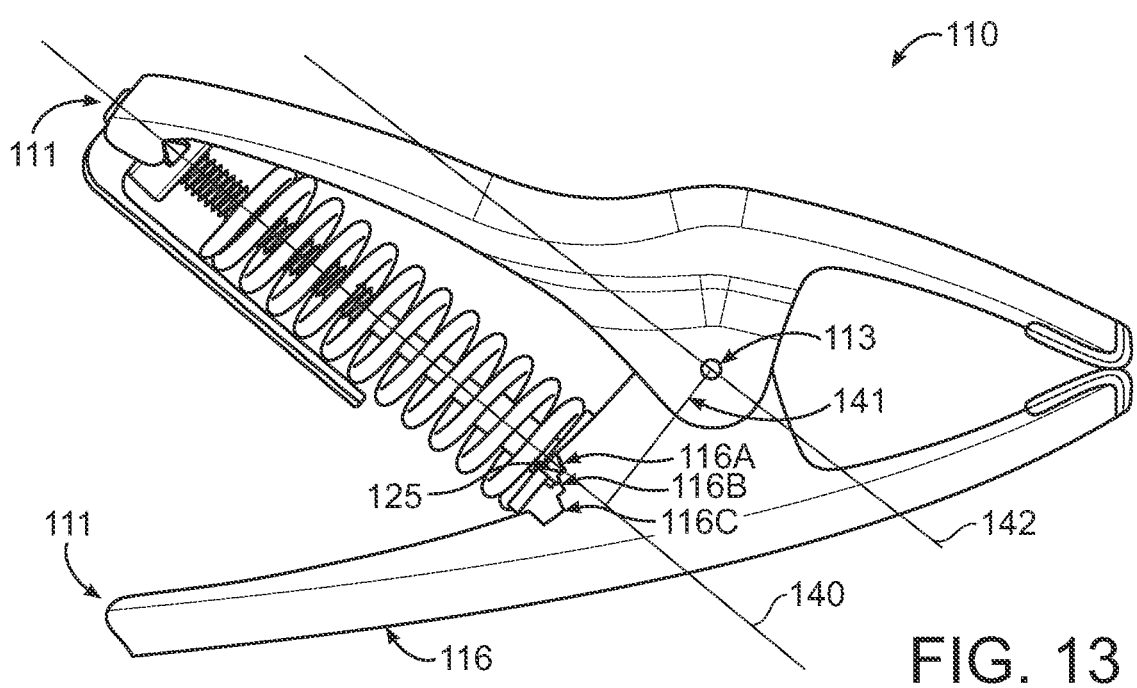
FIG. 13 is a side view of the spring clamp of FIG. 9 in a closed position and identifying the spring force vector and critical distance when perched in notch 116A.

In another example, the spring clamp is configured in FIG. 13 with the mount 125 in notch area 116A, which provides the lowest amount of clamping force compared to when the mount 125 is in notch areas 116B or 116C. When the mount 125 is in notch area 116A, the critical distance 141 is smaller than when in notch areas 116B or 116C. In some embodiments, when the spring clamp 110 is used with the mount 125 in notch area 116A, the clamping power is about 50-67% the clamping power of the spring clamp 110 when used with the mount 125 in the notch area 116C.

Figure 12:
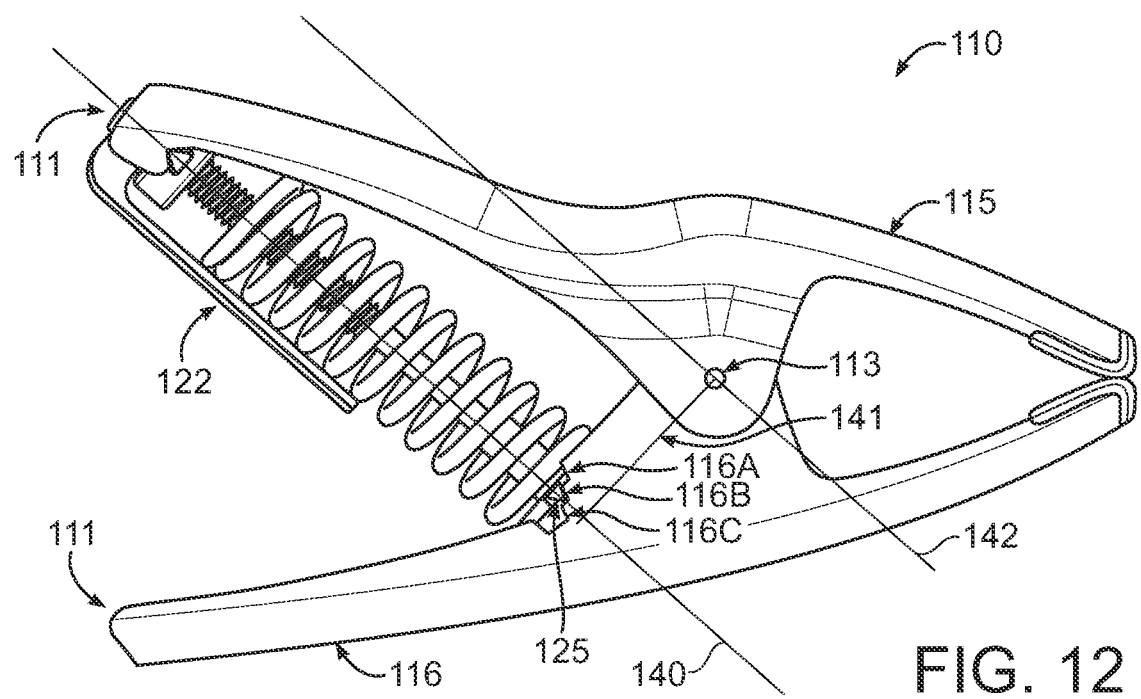
FIG. 12 is a side view of the spring clamp of FIG. 9 in a closed position and identifying the spring force vector and critical distance when perched in notch 116B.

In FIG. 12, the spring clamp 110 is in a closed position and configured with the mount 125 in the notch area 116B. In FIG. 13, the spring clamp 110 is in a closed position and configured with the mount in the notch area 116A. The critical distance 141 is decreased in FIG. 13 when compared to FIG. 12, indicating a lower clamping force when configured using notch area 116A.

Figure 14:
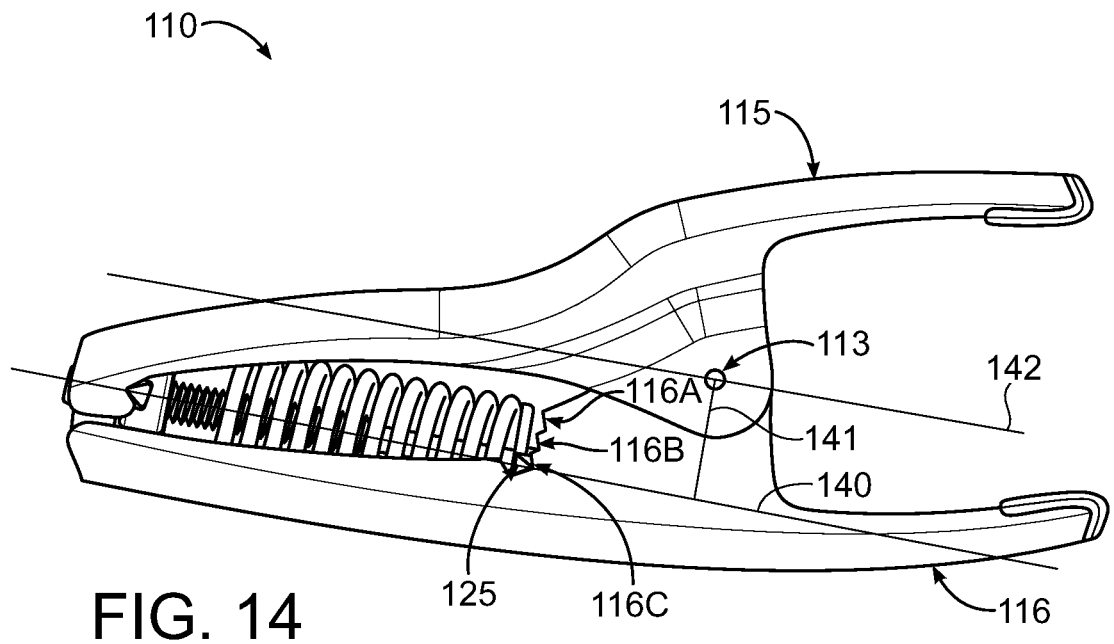
FIG. 14 is a side view of the spring clamp of FIG. 9 in an open position and identifying the spring force vector and critical distance when perched in notch 116C.
Figure 15:
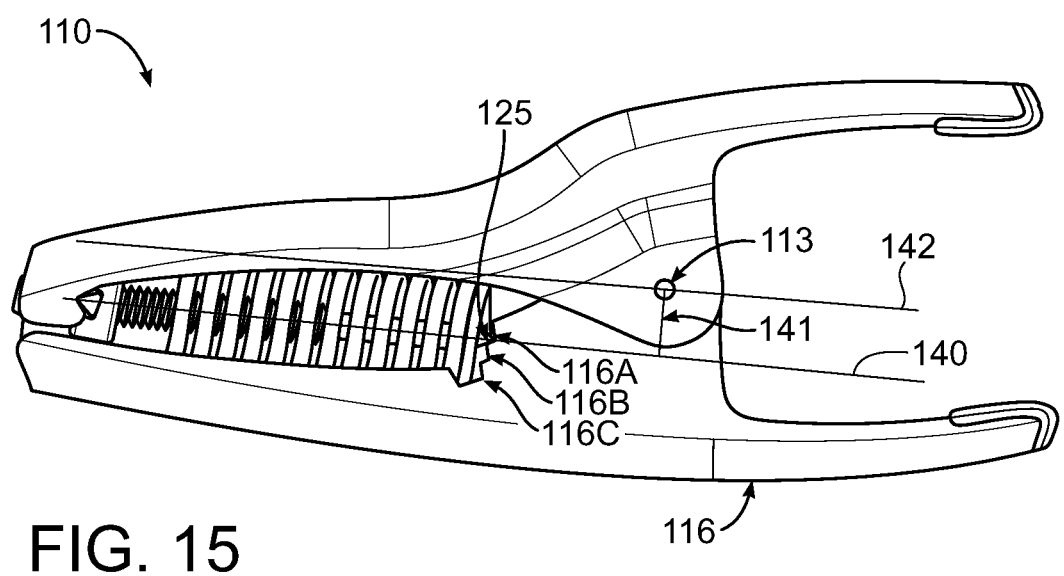
FIG. 15 is a side view of spring clamp of FIG. 9 in an open position and identifying the spring force vector and critical distance when perched in notch 116A.

In FIG. 14, the spring clamp 110 is in an open position and configured with the mount 125 in the notch area 116C. In FIG. 15, the spring clamp 110 is in an open position and configured with the mount in the notch area 116A. The critical distance 141 is decreased in FIG. 15 when compared to FIG. 14, indicating a lower clamping force when configured using notch area 116A.

Moving the mount 125 between the notch areas 116A-116C creates a smaller difference in the critical distance 141 when the spring clamp 110 is in a closed position (as in FIGS. 12 and 13) compared to when the spring clamp 110 is in an open position (as in FIGS. 14 and 15). The difference in the critical distance 141 indicates a difference in power at a particular opening so that the spring clamp 110 in FIG. 14 has more clamping force in a fully open position than the spring clamp 110 in FIG. 15 in a fully open position.

Figure 16:
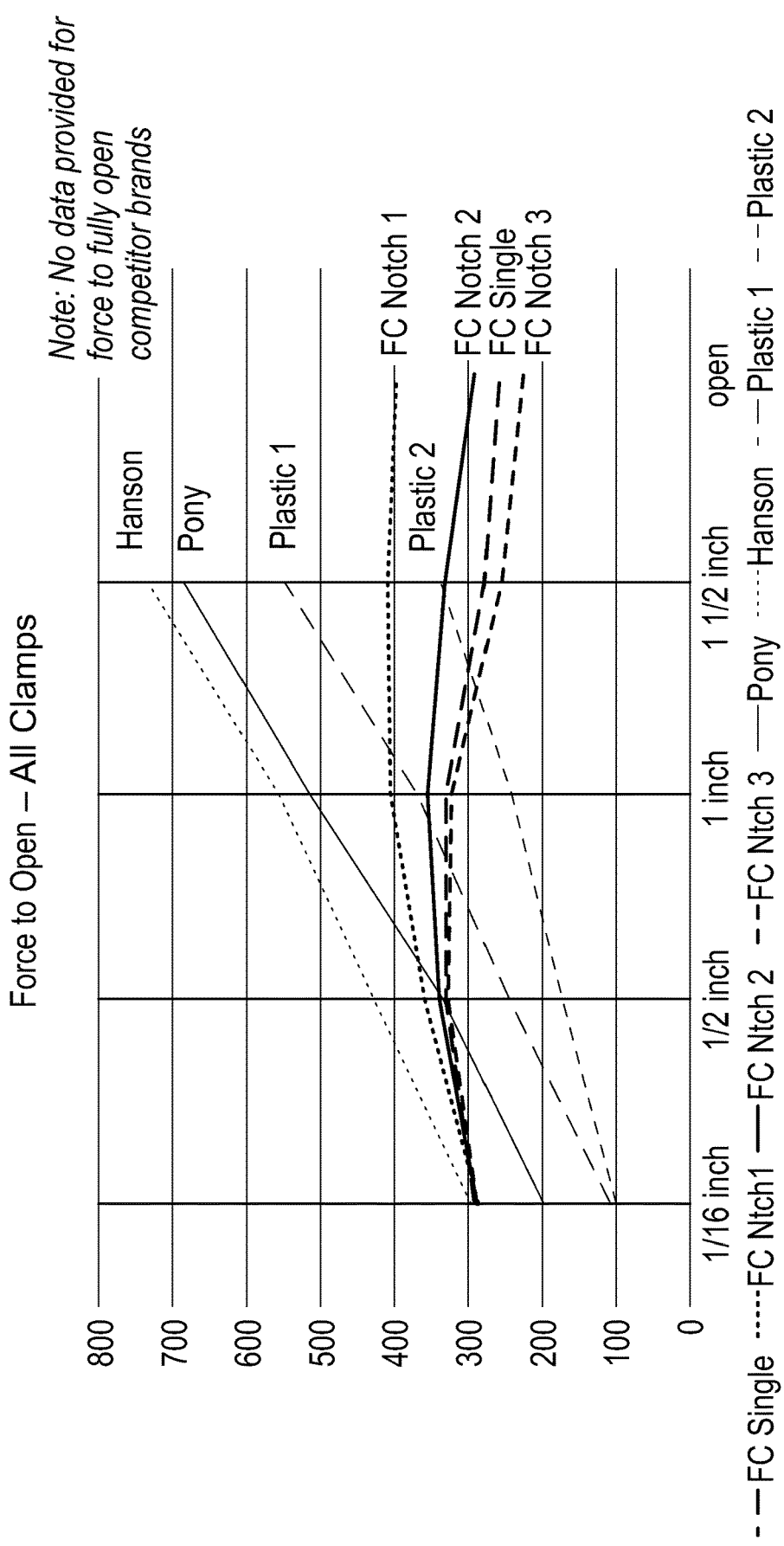
FIG. 16 is a chart comparing the amount of force needed to open the spring clamp of the first embodiment (FIGS. 1-8) and spring clamp of the second embodiment (FIGS. 9-15) compared to traditionally manufactured spring clamps at various jaw opening widths.

FIG. 16 is a chart comparing the amount of force needed to open the first and second example embodiments of the spring clamp compared to traditionally manufactured spring clamps at various jaw opening widths. The vertical axis represents an amount of force needed to open a spring clamp and the horizontal axis represents the distance the jaws of the spring clamp are open. The spring clamp 10 is represented by the line labeled "FC Single" and the spring clamp 110 is represented by the lines "FC Notch 1," "FC Notch 2" and "FC Notch 3." The spring clamp 110 is represented by three lines in the chart because the spring clamp 110 comprises multiple notch areas 116A-116C that allow a user to fine tune the amount of force needed to open the spring clamp 110. The lines labeled "Hanson," "Pony," "Plastic 1" and "Plastic 2" represent traditionally manufactured spring clamps. Compared to traditionally manufactured spring clamps, the spring clamps 10 and 110 have the unexpected result of a fairly flat curve of force to open compared to jaw opening width. The curve can also be described as non-liner and an inverse parabolic curve. In contrast, the traditionally manufactured spring clamps have a linearly increasing force needed as the jaws are opened further.

Figure 17:
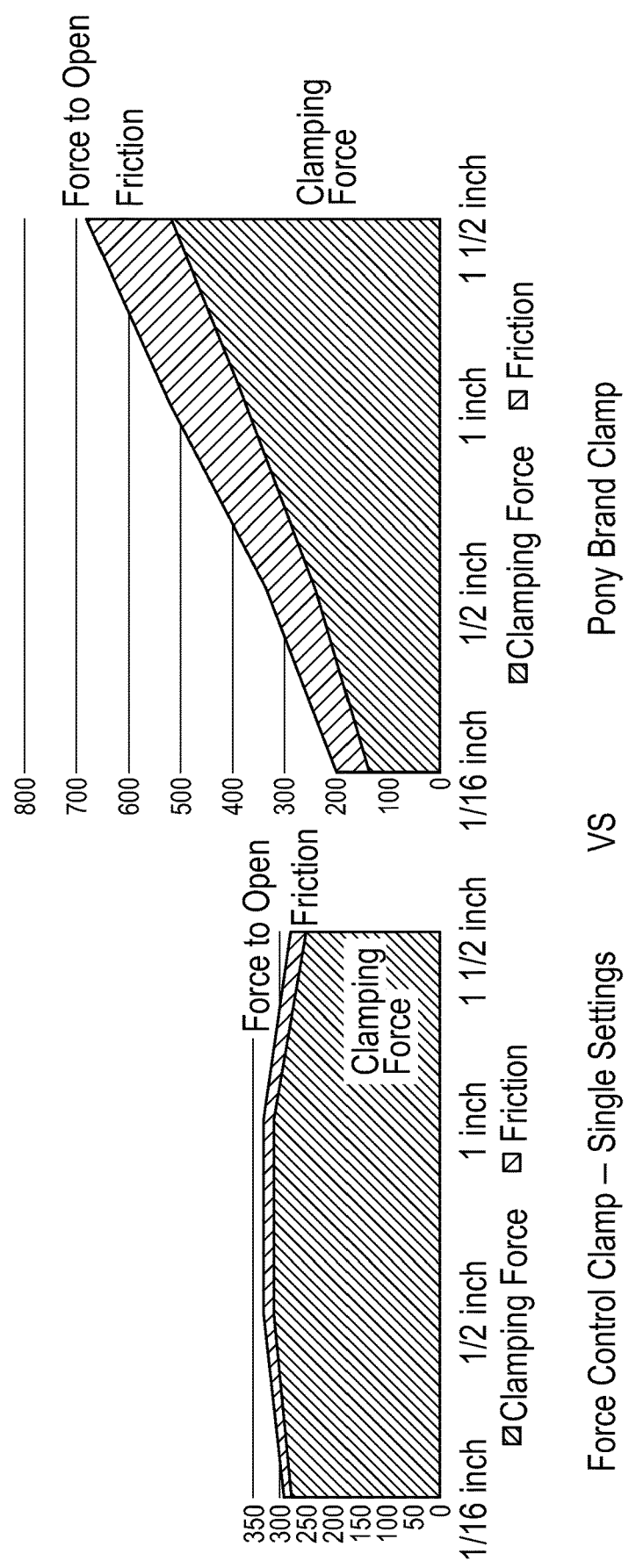
FIG. 17 includes two graphs comparing the spring clamp of the first example embodiment (FIGS. 1-8) to a traditionally manufactured spring clamp. The first graph shows the amount of force needed to open the spring clamp of the first example embodiment (FIGS. 1-8) and how much of the force is attributable to the spring and attributable to the friction in the mechanism. The second graph shows the amount of force needed to open a traditionally manufactured spring clamp and how much of the force is attributable to the spring and attributable to the friction in the mechanism.

In FIG. 17 are two graphs comparing the first example embodiment of the spring clamp 10 to a traditionally manufactured spring clamp. The vertical axis represents an amount of force needed to open a spring clamp 10 and the horizontal axis represents the distance the jaws of the spring clamp are open. The first graph titled "Force Control Clamp—Single Setting" shows the amount of force needed to open the first example embodiment of the spring clamp 10 over a certain jaw opening width and how much of the force is attributable to the spring and how much is attributable to friction in the mechanism. The second graph titled "Pony Brand Clamp" shows the amount of force needed to open a traditionally manufactured spring clamp over a certain jaw opening width and how much of the force is attributable to the spring and attributable to friction in the mechanism. The use of the mounts 24 and 25 and the notch areas 15A generated the unexpected results of greatly reduced amount of friction in the mechanism so that a larger percentage of the force to open the spring clamp 10 is attributable to the coil spring 23 than in the traditionally manufactured spring clamp. The traditionally manufactured spring clamp's force to open has a larger proportion attributable to friction, increasing in proportion due to friction as the jaw width increases.

What has been described is a spring clamp with a reduced effort needed on the handle end as the engagement end is opened further. In this disclosure, there are shown and described only exemplary embodiments of the invention, but, as aforementioned, it is to be understood that the invention is capable of use in various other combinations and environments and is capable of changes or modifications within the scope of the inventive concept as expressed herein.

From the foregoing disclosure and detailed description of certain preferred embodiments, it is also apparent that various modifications, additions and other alternative embodiments are possible without departing from the true scope and spirit. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A spring clamp, which comprises:
    a first arm comprising a handle end opposite an engagement end;
    a second arm comprising a handle end opposite an engagement end;
    the first arm and the second arm rotatably fixed about a pivot point located between the handle end and engagement end of the first arm and the second arm;
    a spring pack comprising a coil spring and operably connected to the first arm and the second arm through a contact between the spring pack and an angular relief in the first arm and an angular relief in the second arm;
    wherein a critical distance is defined between the pivot point and a spring force vector of the spring pack and configured to represent an amount of clamping force exerted by the spring clamp between the first arm's engagement end and the second arm's engagement end;

wherein the second arm further comprises a plurality of angular reliefs defines a plurality of critical distances; and wherein the first arm and the second arm are configured to house the spring pack between the first arm and the second arm when the spring clamp is in any position within its rotational limits.

2. The spring clamp of claim 1, wherein the angular relief on the first arm comprises two planar walls meeting at an apex with an angle of 270 degrees to 310 degrees.

3. The spring clamp of claim 1, the spring pack further comprising:
   a first triangular element fixed to one end and a second triangular element fixed to an opposite end; and
   the first triangular element and the second triangular element comprising a triangular cross-section configured to engage the angular relief on the first arm and the angular reliefs of the second arm, respectively.

4. The spring clamp of claim 3, the angular reliefs each comprising an apex, where the second triangular element is configured to rotate about the apex on the angular relief on the second arm as the spring clamp moves from closed to open.

5. The spring clamp of claim 3, wherein the critical distance is configured to generate a non-linear relationship between the force pushing the handle ends together compared to the distance between the engagement ends for a portion of the rotational limits of the spring clamp; and wherein the critical distance is further configured to generate a non-linear relationship between the force pushing the handle ends together compared to the distance between the engagement ends for a portion of the rotational limits of the spring clamp.

6. The spring clamp of claim 5, wherein the non-linear relationship occurs throughout the entire rotational limits of the spring clamp.

7. The spring clamp of claim 6, wherein the non-linear relationship forms an inverse parabolic curve, peaking when the engagement ends are at the mid-point of their rotational limits.

8. The spring clamp of claim 1, wherein the spring pack comprises:
   a central rod located through the axial center of the coil spring, the central rod including a threaded portion between a first end and a second end;
   a fixed perch fixed to the central rod towards the first end;
   an adjustable perch in threaded communication with the central rod, so that the coil spring is positioned between the fixed perch and adjustable perch and axially about the central rod;
   the threaded portion of the central rod and the adjustable perch configured to rotate relative to the coil spring; and
   an adjuster arm pivotably fixed to the second end of the central rod.

* * * * *